United States Patent
Pitcock

(10) Patent No.: US 6,931,782 B1
(45) Date of Patent: Aug. 23, 2005

(54) MOBILE ROD HOLDER

(76) Inventor: James T. Pitcock, 1300 Barna Ave., Titusville, FL (US) 32780

( * ) Notice: Subject to any disclaimer, the term of this patent is extended or adjusted under 35 U.S.C. 154(b) by 0 days.

(21) Appl. No.: 10/859,197

(22) Filed: Jun. 3, 2004

(51) Int. Cl.$^7$ .................. A01K 97/08; A01K 97/10
(52) U.S. Cl. .................. 43/21.2; 43/54.1; 224/922; 248/512; 248/534
(58) Field of Search .................. 43/21.2, 54.1; 206/315.11; 224/922, 920; 211/70.8; 248/512, 248/534, 535, 538

(56) References Cited

U.S. PATENT DOCUMENTS

| | | | |
|---|---|---|---|
| 2,144,876 A * | 1/1939 | Garnett .................. | 43/21.2 |
| 2,578,181 A * | 12/1951 | Edmunds .................. | 206/315.11 |
| 3,487,947 A * | 1/1970 | Bogar, Jr. .................. | 211/70.8 |
| 4,479,322 A * | 10/1984 | Koppel .................. | 43/21.2 |
| 4,517,761 A | 5/1985 | Bleggi | |
| 4,523,403 A * | 6/1985 | Ivy et al. .................. | 43/21.2 |
| 4,550,520 A * | 11/1985 | Bogue .................. | 43/21.2 |
| 4,582,203 A * | 4/1986 | Davis .................. | 211/70.8 |
| 4,656,774 A | 4/1987 | Terrill | |
| 4,658,533 A * | 4/1987 | Mendoza .................. | 43/21.2 |
| D295,776 S * | 5/1988 | Johansen .................. | 224/922 |
| 4,748,762 A | 6/1988 | Campbell | |
| 4,796,762 A * | 1/1989 | Law .................. | 211/70.8 |
| 4,807,384 A * | 2/1989 | Roberts, Sr. .................. | 43/21.2 |
| 4,854,069 A * | 8/1989 | Smith et al. .................. | 43/21.2 |
| 4,866,873 A | 9/1989 | Van Valkenburg | |
| 4,936,039 A | 6/1990 | Huber | |
| 4,986,427 A * | 1/1991 | Law et al. .................. | 211/70.8 |
| 5,040,324 A * | 8/1991 | Rivera et al. .................. | 224/922 |
| 5,125,183 A * | 6/1992 | Tisdell .................. | 43/54.1 |
| 5,366,076 A * | 11/1994 | Lyles .................. | 206/315.11 |
| 5,446,989 A * | 9/1995 | Stange et al. .................. | 43/21.2 |
| 5,450,688 A * | 9/1995 | Hall .................. | 43/54.1 |
| 5,460,306 A * | 10/1995 | Rudd .................. | 43/21.2 |
| 5,544,797 A * | 8/1996 | Silva .................. | 224/922 |
| 5,557,876 A * | 9/1996 | Parker .................. | 43/21.2 |
| 5,560,138 A * | 10/1996 | Dentsbier .................. | 43/21.2 |
| 5,561,937 A * | 10/1996 | Johnson .................. | 43/21.2 |
| 5,625,974 A | 5/1997 | Demaio | |
| 5,632,427 A * | 5/1997 | Gattuso et al. .................. | 211/70.8 |
| 5,803,519 A * | 9/1998 | Daigle .................. | 211/70.8 |
| 5,860,573 A * | 1/1999 | Hossack et al. .................. | 211/70.8 |
| 5,899,527 A | 5/1999 | Elvidge | |

(Continued)

FOREIGN PATENT DOCUMENTS

GB           2015311 A  *  9/1979

(Continued)

*Primary Examiner*—Darren W. Ark
(74) *Attorney, Agent, or Firm*—GrayRobinson, P.A.; Timothy L. Hughes

(57) ABSTRACT

A portable fishing rod holder for use when fishing with a single or multiple rods designed using a cylinder shaped body with u-shaped grooves which have been machined into the cylinder for the placement of fishing rods while in use, and which has at least two long, self-adhering straps to attach the rod holder by each end in the horizontal or vertical orientation to stable objects of varying shapes and sizes which may be found at the water's edge, and which has shorter straps which extend over the rod shaft after it is inserted into one of the u-shaped grooves and which hold the rod in place, and which has an opening at either end of the cylinder body which is large enough to receive the grip-end of the fishing pole, and which has hook storage openings.

5 Claims, 4 Drawing Sheets

U.S. PATENT DOCUMENTS

| | | | |
|---|---|---|---|
| 6,047,491 A * | 4/2000 | De Busk | 43/21.2 |
| 6,155,001 A * | 12/2000 | Marin | 43/54.1 |
| 6,263,608 B1 | 7/2001 | Ernst | |
| 6,267,425 B1 * | 7/2001 | Dorsey | 43/21.2 |
| 6,338,465 B1 * | 1/2002 | Stoner | 43/21.2 |
| 6,341,443 B1 * | 1/2002 | Watford et al. | 43/21.2 |
| 6,357,639 B1 * | 3/2002 | Williams | 224/922 |
| 6,453,598 B1 * | 9/2002 | Robertson | 43/21.2 |
| 6,471,103 B1 * | 10/2002 | Frese et al. | 206/315.11 |
| 6,499,248 B2 * | 12/2002 | Thompson | 43/21.2 |
| 6,571,507 B2 * | 6/2003 | Elford | 43/21.2 |
| 6,591,542 B1 * | 7/2003 | Jordan | 43/21.2 |
| 6,647,658 B1 | 11/2003 | Park | |
| 6,659,316 B2 * | 12/2003 | Fleming et al. | 211/70.8 |
| 6,672,559 B1 | 1/2004 | Boldia | |
| 6,715,230 B1 * | 4/2004 | Klein | 43/54.1 |
| 6,729,064 B2 * | 5/2004 | Congialosi | 43/21.2 |
| 2003/0051388 A1 * | 3/2003 | Barnes et al. | 43/21.2 |
| 2004/0108235 A1 * | 6/2004 | Lukas | 206/315.11 |
| 2004/0123509 A1 * | 7/2004 | Borgeat | 43/21.2 |
| 2005/0005500 A1 * | 1/2005 | Howley | 43/21.2 |

FOREIGN PATENT DOCUMENTS

| | | | |
|---|---|---|---|
| GB | 2292659 A | * | 3/1996 |
| JP | 7-284362 A | * | 10/1995 |
| JP | 7-327569 A | * | 12/1995 |
| JP | 9-172932 A | * | 7/1997 |
| JP | 10-108604 A | * | 4/1998 |
| JP | 11-69935 A | * | 3/1999 |
| JP | 2000-4744 A | * | 1/2000 |
| JP | 2000-32897 A | * | 2/2000 |
| JP | 2001-224292 A | * | 8/2001 |
| JP | 2001-292676 A | * | 10/2001 |
| JP | 2001-299174 A | * | 10/2001 |
| JP | 2002-34417 A | * | 2/2002 |
| JP | 2002-54613 A | * | 2/2002 |
| JP | 2002-171888 A | * | 6/2002 |
| JP | 2003-18948 A | * | 1/2003 |
| JP | 2003-88286 A | * | 3/2003 |
| JP | 2003-235425 A | * | 8/2003 |
| JP | 2004-33096 A | * | 2/2004 |
| JP | 2005-6609 A | * | 1/2005 |

* cited by examiner

MOBILE ROD HOLDER

BACKGROUND OF THE INVENTION

1. Field of the Invention

This invention is a portable fishing pole or fishing rod holder allowing a fisherman to fish with multiple fishing poles and which is easily attached to any number of stationary objects commonly found at the water's edge, on a dock, at a marina or on a boat. It can also be attached to objects which are commonly used by fishermen for other purposes while fishing, such as a chair leg or chair back. This invention pertains to both fishing poles and fishing rods. The terms "fishing pole" and "fishing rod," as used herein, are intended to have their ordinary meaning. The use of either one of the terms in this application is intended to encompass both terms.

2. Background of the Invention and Related Art

The widespread and prevalent use of fishing for both sport and sustenance has prompted the invention of many fishing aids designed to assist the fisherman. Fishermen often need to use more than one fishing pole at the same time or desire to use just one pole while keeping the fisherman's hands free. The vast majority of fishing pole holders are typically designed for use with only one pole, with the pole inserted in the upper end of a tube or bracket holder which has a spike or screw on the other end which is driven into the ground. An example of this type of holder can be found in U.S. Pat. No. 6,647,658. Other pole holders are designed so that the base of the pole rests on the ground or other surface with the pole shaft leaning against the holder at an angle, much in the same way one might rest a pole against the railing of a dock. An example of this type of holder can be found in U.S. Pat. No. 4,550,520. Finally, there are pole holders designed to mount or clamp based on specific applications. Examples of these can be found in U.S. Pat. No. 5,625,974, U.S. Pat. No. 6,672,559 and U.S. Pat. No. 4,517,761. The existing designs are useful in a limited set of conditions or environments and only for a single pole or rod.

The Mobile Rod Holder is a novel fishing pole holder which is useful in virtually any setting. The Mobile Rod Holder is a simple design which is inexpensive to manufacture, does not require any assembly to use, works with more than one pole at the same time and can be used in conjunction with almost any stable object that one might find at the waters edge, dock, pier, beach or on a boat. The Mobile Rod Holder is small and light enough to carry in a standard tackle box and meets the need of fishermen to use multiple fishing poles in any variety of environments.

SUMMARY OF THE INVENTION

It is a general object of the present invention to provide a fishing pole holder which is mountable on a wide variety of structures and eliminate the need to purchase multiple pole-holding devices for use in differing circumstances. Design features allowing these objectives to be accomplished include: (1) the use of a single, light-weight, hollow cylinder, with an inner diameter large enough to receive the proximal end of a fishing pole in either cylinder end when the holder is used in a vertical orientation; (2) the machining of u-shaped grooves perpendicular to the longitudinal axis of the cylinder, into which fishing pole shafts may be placed when the holder is used in the horizontal orientation, thereby eliminating the need to purchase a separate holder for each pole; and (3) the use of adjustable length straps, which are permanently affixed to the cylinder, which mount and stabilize the holder by wrapping around stationary objects such as poles, railings, chair legs, chair backs, the fisherman's leg or any other reasonably sized object which the fisherman may find at the water's edge, eliminating the need for a specific attachment configuration or a specific ground surface type, slope or condition.

It is a general object of the present invention to provide a fishing pole holder which prevents the pole from falling down or into the water and which prevents the pole from springing back out of the holder when the tension on the line is abruptly released or when the holder is disturbed by vibration, contact from another object, wind or similar forces. When the holder is used in a horizontal orientation, this objective is accomplished by using stabilizing straps which are permanently affixed to the cylinder, and which lay over the pole shaft after it is inserted into one of the u-shaped grooves in the cylinder, securing the pole to the holder. The straps attach at their free end to the cylinder by means of an easy release fastener which can be quickly released by the fisherman upon getting a strike on the line. When used in a vertical orientation; this objective is accomplished by placing the proximal end of a fishing pole in the opening at either end of the hollow cylinder preventing the pole from coming out of the holder when the pole is disturbed by typical forces.

It is still another objective of the present invention to be a functional tool which is easy to use, carry, and store, and which requires virtually no assembly. The design feature allowing this objective to be accomplished is the use of a single, specifically designed cylinder-shaped member to which all other parts are permanently affixed. By creating, in essence, a single component pole holder, the holder is simply pulled out of storage and strapped to whatever stable object is available to the fisherman without the need to assemble or locate other parts. The holder may also be used to facilitate safe and convenient storage of fishing poles.

It is yet another object of the present invention to provide fishermen a tool which is inexpensive, durable and easy to maintain. Design features allowing this object to be achieved include the fact that the tool is composed of very few parts which comprise a single operational unit, has no components to assemble which may wear out or get lost, and uses components which can be made of any number of inexpensive and readily available materials. Benefits associated with this holder include reduced production costs, increased availability, no maintenance and related upkeep costs, and longevity of service.

BRIEF DESCRIPTION OF THE DRAWINGS

The invention, together with the other objects, features, aspects and advantages thereof, will be more clearly understood from the following in conjunction with the accompanying drawings.

Four sheets of drawings are provided. Sheet one contains FIG. 1. Sheet two contains FIG. 2. Sheet three contains FIG. 3. Sheet 4 contains FIG. 4.

DETAILED DESCRIPTION OF THE PREFERRED EMBODIMENT

Figure 1:
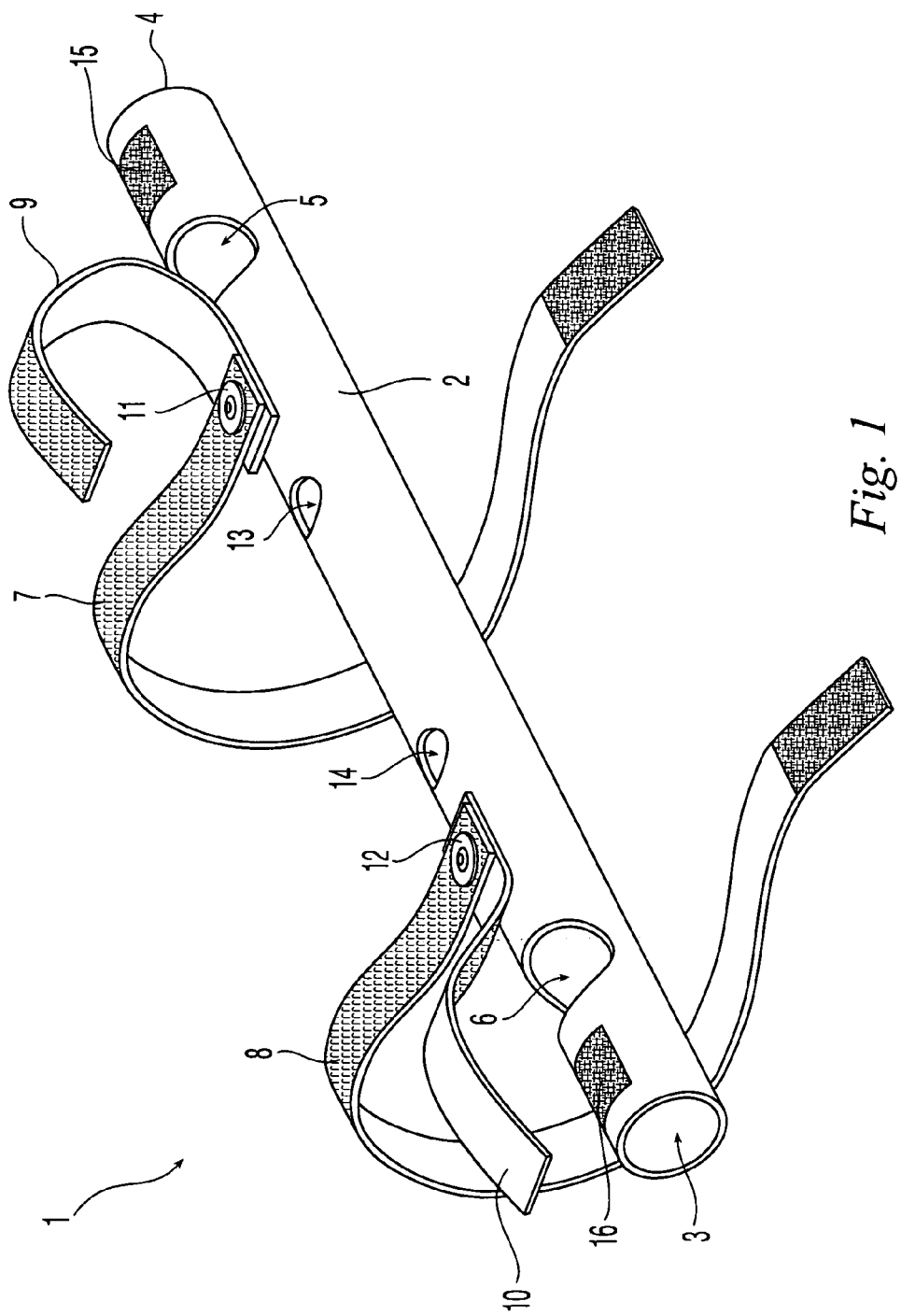
FIG. 1 is a perspective view of the Mobile Rod Holder Assembly 1.

FIG. 1 is a perspective view of the Mobile Rod Holder Assembly 1. The Mobile Rod Holder Assembly 1 comprises a cylinder 2 which can be approximately 12 inches in length, 1¼ inches in diameter, made of light weight, non-corrosive material with a bore extended longitudinally therethrough, two u-shaped grooves 5 and 6 machined into the cylinder 2, two longer straps 7 and 8 and two shorter straps 9 and 10 permanently affixed to the cylinder 2 using metal rivets 11 and 12 or other attachment means, complimentary adhering material or attaching means 15 and 16, and a pair of hook storage holes 13 and 14 machined into the cylinder 2 at two locations on the same side of the cylinder 2 as the u-shaped grooves 5 and 6. More than two u-shaped grooves may be machined into the same side of the cylinder 2 (not shown in the figures). The u-shaped grooves 5 and 6 are machined into the same side of the cylinder 2, with u-shaped groove 5 located near one end of the cylinder 2 and u-shaped groove 6 located near the opposite end of the cylinder 2 and with each groove approximately 1" to 2" from the corresponding end of the cylinder, and are machined across the width of the cylinder 2 at a 90 degree angle to the cylinder 2's longitudinal axis to a depth of approximately one-half of the diameter of cylinder 2. The longer strap 7 and the shorter strap 9 are affixed permanently at the same attachment point by their proximal ends near the u-shaped groove 5 on one end of the cylinder 2, with the longer strap 7 oriented to extend perpendicular to the longitudinal axis of the cylinder 2 and the shorter strap 9 oriented to extend parallel to the longitudinal axis of the cylinder 2, crossing over the u-shaped groove 5. Longer strap 8 and shorter strap 10 are affixed permanently at the same attachment point by their proximal ends near the u-shaped groove 6 at the opposite end of cylinder 2 from the long strap 7 and short strap 9, with longer strap 8 oriented to extend perpendicular to the longitudinal axis of the cylinder 2 and shorter strap 10 oriented to extend parallel to the longitudinal axis of the cylinder 2, crossing over the u-shaped groove 6. When more than two u-shaped grooves 5 and 6 are machined into the cylinder 2, the shorter straps may be affixed to the cylinder 2 using rivets or attachment means without a concurrent long strap affixed to the cylinder 2 at the same attachment point (not shown in figures). The longer straps 7 and 8 are approximately 1 inch in width the same length and are made of flexible material which attaches or otherwise adheres onto itself and are long enough for each to wrap around various fixed objects one might find at the water's edge and still reach back to adhere to itself. The shorter straps 9 and 10 are made of the same or similar material as the longer straps 7 and 8 which could be Velcro material and are long enough for each to extend over and beyond the u-shaped groove nearest to it and extend slightly past the ends of the cylinder 2. The distal ends of the shorter straps 9 and 10 are made of Velcro or otherwise contain a means to firmly, but temporarily, affix the distal end of the shorter straps 9 and 10 to the complimentary adhering material or attaching means 15 and 16. The complimentary adhering material or attaching means 15 and 16 are located between the u-shaped grooves 5 and 6 and cylinder ends 3 and 4 and are permanently attached to the cylinder 2. The materials or means used to adhere the distal ends of the shorter straps 9 and 10 are suitable for repeated attachment and detachment of the shorter straps 9 and 10 to the complimentary adhering material or attaching means 15 and 16 on the cylinder 2 as fishing poles are inserted into and removed from the u-shaped grooves 5 and 6. The furthest portions of the distal ends are made to stay unattached to facilitate grasping of the distal ends while attaching and detaching the remainder of the distal ends of the strap from the cylinder.

Figure 2:
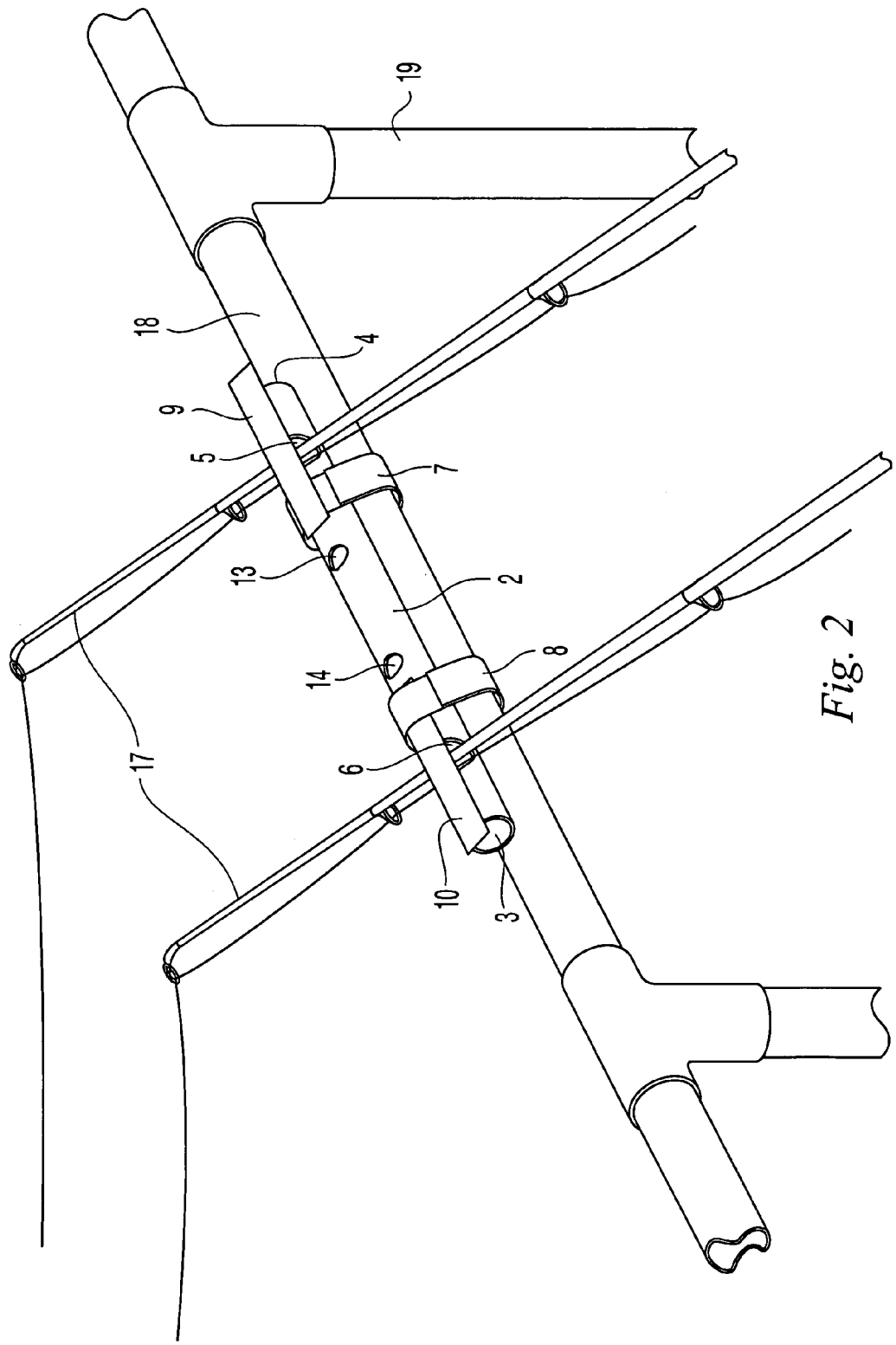
FIG. 2 is a perspective view of the Mobile Rod Holder Assembly 1 being used in a horizontal position, attached to a horizontal railing member 18.

FIG. 2 is a perspective view of the Mobile Rod Holder Assembly 1 in a horizontal position, secured by the long straps 7 and 8 to a horizontal railing member 18 with two fishing rods 17 resting in the u-shaped grooves 5 and 6, with the short straps 9 and 10 securing the rods in place, and the hook storage holes 13 and 14 machined into the cylinder 2.

Figure 3:
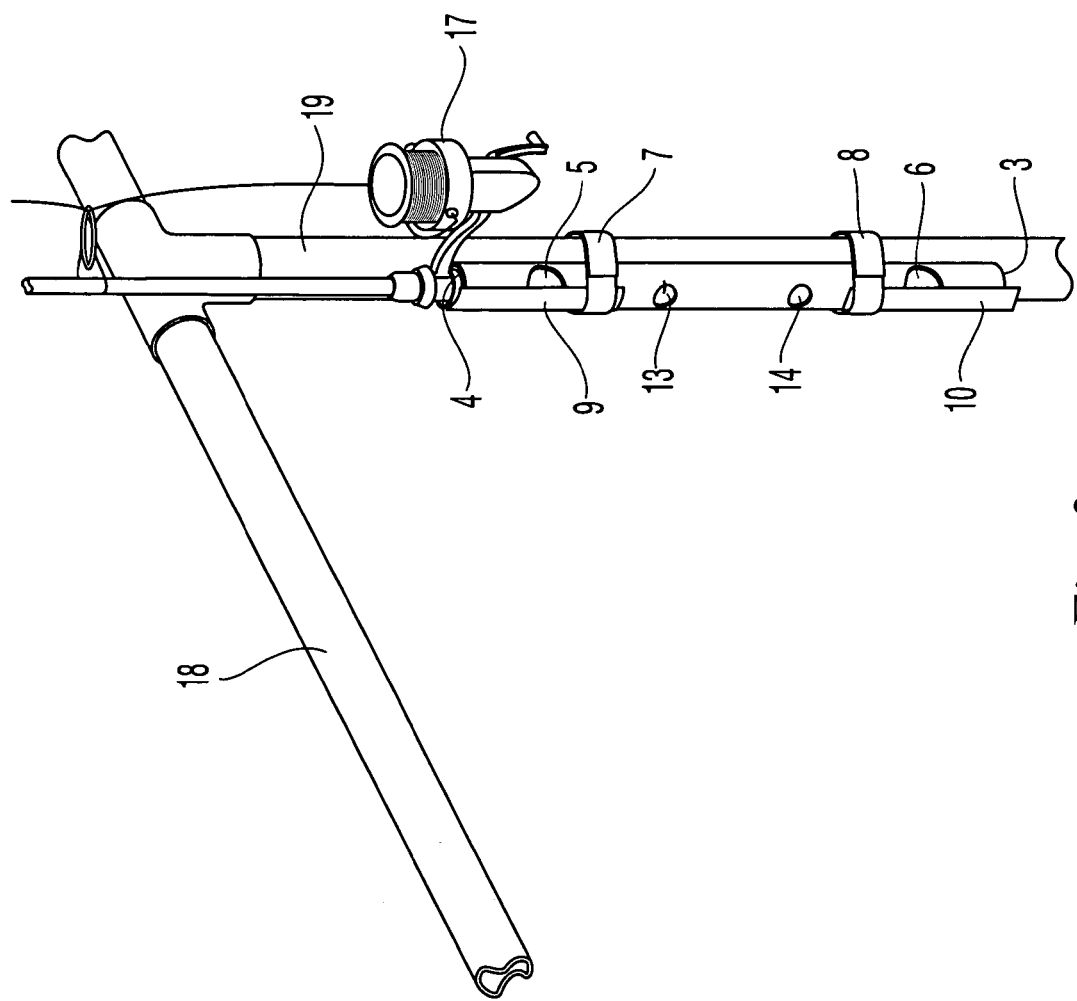
FIG. 3 is a perspective view of Mobile Rod Holder Assembly 1 being used in a vertical position, attached to a vertical railing support member 19.

FIG. 3 is a perspective view of the Mobile Rod Holder Assembly 1 in a vertical position attached by the long straps 7 and 8 to a vertical railing support member 19 with one fishing rod 17 inserted into the cylinder end 4.

Figure 4:
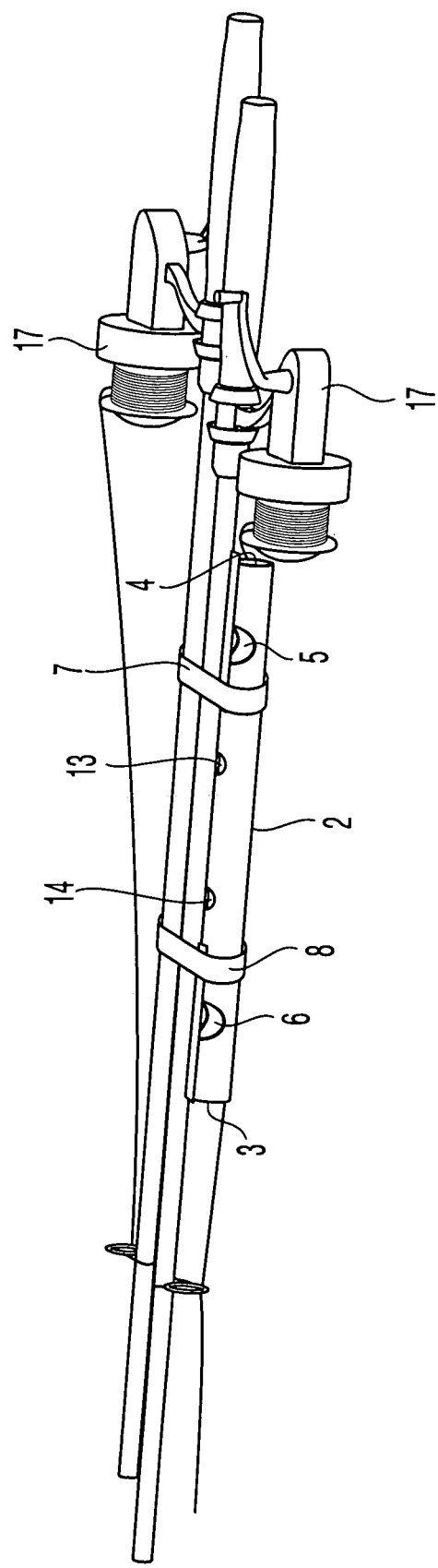
FIG. 4 is a perspective view of the Mobile Rod Holder Assembly 1 being used to store and transport two fishing rods 17.

FIG. 4 is a perspective view of the Mobile Rod Holder Assembly 1 with the long straps 7 and 8 wrapped around two fishing rods 17 for easy storage and transportation.

DRAWING ITEM INDEX

1 Mobile Rod Holder Assembly
2 Cylinder Body
3 Cylinder End
4. Cylinder End
5. U-shaped Groove
6. U-shaped Groove
7. Long Strap
8. Long Strap
9. Short Strap
10. Short Strap
11 Rivet affixing Long and Short Strap pair
12 Rivet affixing Long and Short Strap pair
13 Hook Storage Hole
14 Hook Storage Hole
15 Complimentary Adhering Material or Attaching Means
16 Complimentary Adhering Material or Attaching Means
17 Fishing Rod
18 Horizontal Railing Member
19 Vertical Railing Support Member

I claim:

1. A tool for holding multiple fishing rods of varying sizes and designed to mount to a wide variety of structures comprising:

a cylinder having a bore extended longitudinally therethrough and u-shaped grooves machined into and along one side of the cylinder at a 90 degree angle to the cylinder's longitudinal axis;

a series of long straps, two of said long straps being respectively positioned near a corresponding end of the cylinder, with a proximal end of each said long strap attached to the cylinder with a rivet or attachment means, such that a distal end of each said long strap extends away from the cylinder's longitudinal axis at a 90 degree angle, each said long strap being made of a flexible material which is long enough to wrap around stationary objects of varying perimeter sizes and then adhere to itself;

a series of short straps, corresponding in number to a number of the u-shaped grooves machined into the cylinder, with a proximal end of each said short strap attached to the cylinder at a respective location directly beside a corresponding one of the u-shaped grooves, and each said short strap attached either alone with a rivet or attachment means or in conjunction with a coincident long strap of said series of long straps using the same rivet or attachment means when one of the long straps is also present at the same location, such that a distal end of each said short strap extends parallel to the cylinder's longitudinal axis and over a corresponding one of the u-shaped grooves machined into the cylinder when the distal end of each said short strap makes contact with the cylinder, with the distal end of each said short strap being made out of a material or having means capable of repeated attachment and detachment to a corresponding or mating material with a furthest portion of the distal end made to stay unattached to facilitate grasping while attaching and detaching the remainder of the distal end of the strap from the cylinder; and a means on the cylinder for repeatedly attaching and detaching the distal ends of said short straps to and from the cylinder as fishing poles are inserted into the u-shaped grooves, secured, then later removed.

2. The tool as claimed in claim 1, wherein said means for repeatedly attaching and detaching the distal ends of said short straps comprises:

a complimentary adhering material or attaching means permanently affixed to the cylinder at a location next to each of said u-shaped grooves and corresponding in location to where the distal end of the corresponding short strap makes contact with the cylinder, said complimentary adhering material or attaching means being suitable for repeated attachment to and detachment from the distal ends of said short straps as fishing poles are inserted into the u-shaped grooves, secured, then later removed.

3. A tool for holding multiple fishing rods of varying sizes and designed to mount to a wide variety of structures comprising:

a cylinder of approximately 12 inches in length and approximately 1¼ inches in diameter, having a bore extended longitudinally therethrough, made of light weight, non-corrosive material, and having two u-shaped grooves, each machined into a same side of the cylinder, approximately 1" to 2" from a corresponding end of said cylinder, at a 90 degree angle to the cylinder's longitudinal axis, with each u-shaped groove machined at a depth of roughly one half of the diameter of the cylinder;

a set of two long straps, made of flexible material, approximately 1 inch in width and long enough to wrap around stationary objects of varying perimeter sizes and then adhere to itself, with said long straps respectively positioned near a corresponding end of the cylinder, with a proximal end of each said long strap attached to the cylinder with a rivet or attachment means, such that a distal end of each said long strap extends away from the cylinder's longitudinal axis at a 90 degree angle;

a set of two short straps, with a proximal end of each said short strap attached to the cylinder at a respective location directly beside a corresponding one of the u-shaped grooves, and each said short strap attached in conjunction with a coincident long strap of said two long straps using the same rivet or attachment means, such that a distal end of each said short strap extends parallel to the cylinder's longitudinal axis and over a corresponding u-shaped groove machined into the cylinder when the distal end of each said short strap makes contact with the cylinder, with the distal end of each said short strap being made out of a material or having means capable of repeated attachment and detachment to a corresponding or mating material, with the distal end of each said short strap extending beyond the corresponding cylinder end to facilitate grasping while attaching and detaching the distal end of each said short strap from the cylinder; and a complimentary adhering material or attaching means permanently affixed to the cylinder between each said u-shaped groove and corresponding cylinder end, said complimentary adhering material or attaching means being suitable for repeated attachment to and detachment from the distal ends of said short straps as fishing poles are inserted into the u-shaped grooves, secured, then later removed.

4. The tool as claimed in claim 3 wherein said cylinder has two or more holes drilled therein perpendicular to the cylinder's longitudinal axis which are capable of storing fish hooks.

5. The tool as claimed in claim 3 wherein the long straps and the short straps are made of Velcro material.

* * * * *